US005092927A

United States Patent [19]

Curti et al.

[11] Patent Number: 5,092,927

[45] Date of Patent: Mar. 3, 1992

[54] PAD COATING FOR CARBONLESS PAPER PRODUCTS

[75] Inventors: Patricia D. Curti, Wisconsin Rapids; Fred J. Martin, Junction City; Marvin A. DeWitt, Nekoosa, all of Wis.

[73] Assignee: Nekoosa Papers, Inc., Port Edwards, Wis.

[21] Appl. No.: 528,915

[22] Filed: May 23, 1990

Related U.S. Application Data

[63] Continuation of Ser. No. 206,508, Jun. 14, 1988, abandoned.

[51] Int. Cl.[5] ...................... C09D 11/04; C09D 11/14

[52] U.S. Cl. ........................................ 106/24; 106/25; 106/161; 106/214

[58] Field of Search ..................... 106/21, 25, 26, 204, 106/214, 24, 161

[56] References Cited

U.S. PATENT DOCUMENTS

| | | | |
|---|---|---|---|
| 3,574,791 | 4/1971 | Sherman et al. | 524/546 |
| 3,664,987 | 5/1972 | Moyer et al. | 106/2 |
| 3,767,439 | 10/1973 | Moyer et al. | 106/213 |
| 3,859,090 | 1/1975 | Yoerger et al. | 430/276 |
| 3,901,700 | 8/1975 | Yoerger et al. | 430/303 |
| 3,928,707 | 12/1975 | Lauterbach et al. | 106/214 |
| 3,948,668 | 4/1976 | Hayek et al. | 106/26 |
| 3,975,352 | 8/1976 | Yoerger et al. | 526/245 |
| 4,074,009 | 2/1978 | Sanders | 428/421 |
| 4,321,404 | 3/1982 | Williams et al. | 427/146 |
| 4,515,640 | 5/1985 | Kaschig et al. | 106/213 |
| 4,985,473 | 1/1991 | Williams et al. | 525/276 |

*Primary Examiner*—William R. Dixon, Jr.
*Assistant Examiner*—Helene Klemanski
*Attorney, Agent, or Firm*—Hill, Van Santen, Steadman & Simpson

[57] ABSTRACT

A pad coat for a carbonless paper product is provided. The pad coat comprises a binder; a pigment; and an adhesive component capable of preventing a fan-out padding adhesive from substantially penetrating and wetting a surface of the carbonless paper product. In an embodiment, the binder is a starch. In an embodiment, the pigment is chosen from the group of materials consisting of alumina trihydrate, calcium carbonate, clay, calcined clay, and silicates. In an embodiment, the adhesive component is a fluorinated compound. Preferably, the pad coat is mixed with water to make a solution, the solution comprising approximately 5 to about 60% solids and approximately 40 to about 95% water.

6 Claims, 1 Drawing Sheet

PAD COATING FOR CARBONLESS PAPER PRODUCTS

This is a continuation of application Ser. No. 206,508 filed June 14, 1988, now abandoned.

BACKGROUND OF THE INVENTION

A. Field of the Invention

The present invention relates generally to carbonless paper products. More specifically, the present invention relates to the pad coating for carbonless paper products.

B. The Prior Art

Carbonless paper products are known in the art. These products function to afford one the ability to make "carbons" or duplicates of a document, bill of lading, invoice, or the like, without the need for carbon paper. As is clearly evident, carbon paper has several disadvantages. These disadvantages include the fact that it is a cumbersome, sometimes difficult, process to insert carbon paper between the sheets of paper upon which a duplicate is to be made and the process of so inserting the carbon paper and removing same can be messy. To resolve some of the disadvantages inherent with carbon paper, carbonless paper was developed.

Briefly, carbonless paper typically includes a paper substrate upon which a front coating (hereinafter "CF") and a back coating (hereinafter "CB") are coated on respective sides of a paper substrate. The CF and CB have compositions such that upon a mixing of the CF and CB a mark is generated.

Accordingly, in constructing a carbonless paper product, the sheets of paper are oriented so that the sheets of paper on which a duplicate copy is to be made all include, on a front surface thereof, a CF layer. This CF layer is located in juxtaposition to a CB layer that is located on the back surface of all of the sheets of paper from which a duplicate is to be generated. An inter mixing of the CF and CB layer is created by the exertion of a sufficient force on a front face of the paper. This results in the generation of a mark, on the underlying layers of the carbonless paper, that corresponds to the mark made on the original front surface of the top sheet.

Carbonless paper has especially enjoyed commercial success in applications where two or three duplicates of a form are required. Such forms include, for example, bills of lading, invoices, credit card receipts, and the like. These documents typically comprise two or more sheets that are secured together by some means. One of the most common ways to secure the sheets together is to use an adhesive coating that is coated along one edge of the sheets. This typically is called a fan-out padability adhesive. Such adhesives are commercially available from the Appleton Paper Co., Minnesota Mining and Manufacturing Co., and Mead Paper Co., among others.

One of the disadvantages in using such an adhesive coating, however, is that these form sets are typically generated by the thousands and it is not economical to separately coat each set of sheets that define the form. Instead, a pad coat is utilized on at least the bottom of the last sheet of each set of the forms, and often on the top of the first sheet of the form set as well. The function of the pad coats is to prevent the individual sets of forms from sticking together when the fan-out padability adhesive is applied thereto. The use of a pad coat results in the individual sheets that define one form set being secured together but not the form sets themselves. The capacity of the last sheet of one form set to separate from the first sheet of a next form set is called "fanapart" or "padability."

Although pad coats have been developed that provide some fanapart of the form sets after an adhesive is applied, these coats have not been entirely satisfactory. One problem is that, in many instances, the back of the last sheet of a form set must contain instructions, contract terms, or other necessary information. Accordingly, any such pad coating coated on the back surface of the last sheet must allow this surface to be printed thereon. However, some prior pad coats, when coated on a paper product, create a surface that has poor printability.

Still further, it is necessary for any such pad coat to have characteristics such that it can coat the base paper, or paper substrate, through commercial production techniques.

SUMMARY OF THE INVENTION

The present invention provides an improved pad coat for carbonless paper that affords the form sets good padability when a fan-out padding adhesive is applied along an edge of the individual sheets of paper by conventional techniques. Furthermore, the pad coat provides a surface which retains the good printability characteristics of the paper itself.

The pad coat of the present invention comprises: a binder; a pigment; and an abhesive component, i.e., a composition capable of preventing fan-out padding adhesive from substantially penetrating and wetting the back of the CF and front of the CB sheets of the carbonless form set.

Preferably: the binder is a starch; the pigment is chosen from the group of materials consisting of alumina trihydrate, calcium carbonate, clay, calcined clay, and silicates; and the abhesive component is a fluorinated compound.

In an embodiment of the present invention, the pad coating includes a thickener. Preferably, the thickener is chosen from the group of materials consisting of carboxymethylcellulose, hydroxyethylcellulose, and alginate.

In an embodiment of the present invention, the pad coating includes a pH adjuster and a dispersing agent.

Preferably, the pad coat formulation is applied to the paper as an aqueous dispersion. Preferably, the solution comprises approximately 5 to about 60% by weight solids and approximately 40 to about 95% by weight water.

Preferably, the solids comprise approximately 20 to about 80% by weight binder, 20 to 80% by weight pigment, and approximately 0.5 to about 10% by weight of an abhesive component.

The present invention also provides an improved carbonless paper product comprising a paper base and a back coating comprising the pad coat of the present invention.

Additional features and advantages are described in, and will be apparent from, the detailed description of the presently preferred embodiments and from the drawings.

DETAILED DESCRIPTION OF THE PRESENTLY PREFERRED EMBODIMENTS

Figure 1:
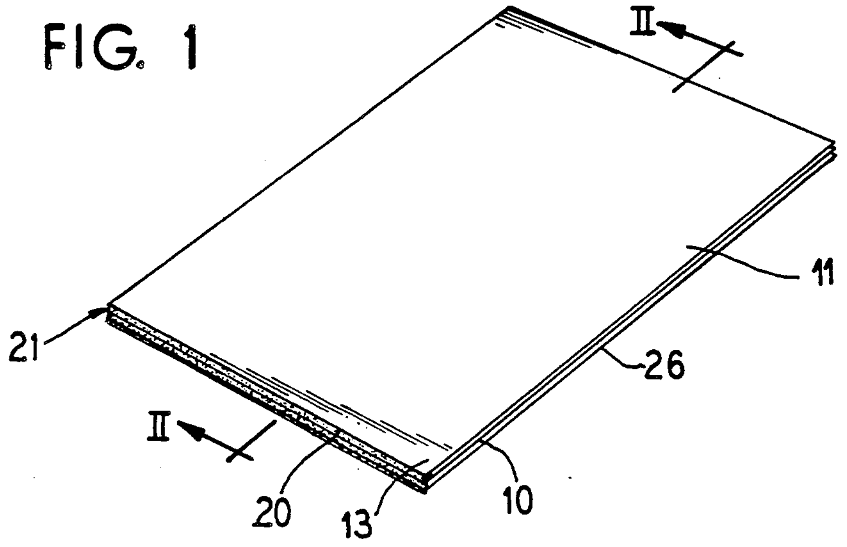
FIG. 1 illustrates a top plan view of a plurality of sheets of paper, one of which includes the pad coat of the present invention.

The present invention provides an improved pad coat for a carbonless paper product. More specifically, the present invention provides a pad coat that prevents fan-out padding adhesive from substantially wetting and penetrating at least the edge of the paper base and therefore, affords good padability of certain sheets of the paper product after the sheets are secured together by a fan-out padding adhesive.

The pad coat comprises: a binder; a pigment; and an abhesive component.

The binder of the present invention functions to allow attachment of the other components to the paper, and preferably is a starch, but other binders, such as proteins and polyvinyl alcohol, can also be utilized. Such starches as corn starch, wheat starch, and potato starch have been found to function satisfactorily. Most preferably, the binder of the present invention is a hydroxyethylated corn starch. A hydroxyethylated corn starch purchased from Penick and Ford, of Iowa, under the name Penford Gum 260, has been found to function satisfactorily.

The pigment of the pad coat composition functions, at least in part, to increase the ink receptivity of the pad coat. This improves the printability on the surface of the paper coated with the pad coat of the present invention. Accordingly, any pigment having good ink receptive characteristics can be utilized, however, preferably, the pigment is chosen from the group of materials consisting of: calcium carbonate; clay; calcined clay; silicates; and alumina trihydrate. Most preferably, the pigment is alumina trihydrate. An alumina trihydrate purchased from Alcoa, under the name Hydral 710B, has been found to function satisfactorily in the pad coat of the present invention.

The abhesive component is preferably a fluorinated compound. Preferably, the fluorinated compound contains at least one fluorinated aliphatic radical therein. The radical can be described as a fluorinated, saturated, monovalent, non-aromatic, aliphatic radical of at least three carbon atoms in length. Examples of fluorinated compounds that will function as an abhesive component herein are set forth in U.S. Pat. No. 4,074,009, the disclosure of which is incorporated herein by reference. As set forth in that patent, methods for the preparation of polymers containing appropriate fluorinated radicals are set forth in U.S. Pat. No. 3,574,791, the disclosure of which is also incorporated herein by reference. A fluoridated compound available from Minnesota Mining and Manufacturing Company of St. Paul, Minnesota, under the name FC-808, has been found to function satisfactorily.

Preferably, the above-mentioned solids of the pad coat are mixed with water to form a dispersion which can be coated onto the paper product. Preferably, the water and solids are mixed so that a mixture that comprises approximately 5 to about 60% by weight solids and approximately 40 to about 95% by weight water is created. Most preferably, the solids comprise approximately 15 to about 30% by weight of the mixture and the water comprises approximately 70 to about 85% by weight of the mixture.

The exact composition of the mixture will depend upon several factors. One of the more important determinative factors will be the type of coating apparatus to be utilized to coat the mixture on the paper product. Depending on the coating apparatus used, one may want to lower or raise the solid content. For example, with a Billblade coater, a mixture having approximately 21% by weight solids has been found to function satisfactorily.

With respect to the non-water portion of the mixture, i.e., the solids, preferably, the solids comprise: 20 to about 80% by weight binder; 20 to about 80% by weight pigment; and 0.5 to about 10% by weight of the abhesive component. Most preferably, the solids comprise: approximately 35 to about 65% by weight pigment; approximately 35 to about 65% by weight binder; and approximately 1 to about 5% by weight of abhesive component.

If desired, the pad coat composition can include other additives. For example, it may be desirable to include in the composition a thickener, a pH adjuster, and/or a dispersing agent.

In an embodiment, the pad coat composition includes a thickener. The thickener functions, at least in part, to increase the viscosity of the composition, which can be desirable for certain coating operations, e.g. when applied to unsized paper.

Preferably, the thickener is chosen from the group of materials consisting of hydroxyethylcellulose, carboxymethylcellulose, or alginate. A carboxymethylcellulose purchased from Hercules, Inc., Wilmington, Delaware, under the name CMC7-L, has been found to function satisfactorily.

If a thickener is used, preferably it comprises approximately 0.2 to about 3 weight percent of the solids. Most preferably, the thickener comprises approximately 0.5 to about 2 percent by weight of solids.

Whether a pH adjuster is necessary or not will depend on: the pH of the water which is utilized to make the mixture and the type of machinery being utilized to coat the pad composition onto the paper product. Certain coating apparatus are designed to function and coat paper with either a basic or acidic mixture. Accordingly, depending on the pH of the water utilized to make the mixture, it may be necessary to raise or lower the pH of the mixture. If it is desired to raise the pH of the mixture, ammonium hydroxide has been found to function satisfactorily.

It may also be desirable to utilize a dispersing agent. Depending on the pigment that is utilized, a dispersion agent may or may not be necessary. If Hydral 710B is utilized, it has been found that a sodium polyacrylate copolymer aids dispersion of the Hydral 710B in the water. A sodium polyacrylate copolymer available from Colloids, Inc., Newark, New Jersey, as Colloids 230 has been found to function satisfactorily. If a dispersing agent is utilized, preferably, it comprises slightly greater than 0% to about 1% of the solids by weight.

Referring now to the figures an example of a carbonless paper product utilizing the composition of the present invention is illustrated. FIG. 1 illustrates a plurality of sheets of paper 10, 13, 26. As illustrated, sheets 10 and 13 are bonded together by an adhesive coating 20 to form a unit 21, which can be, for example, a form.

Figure 2:
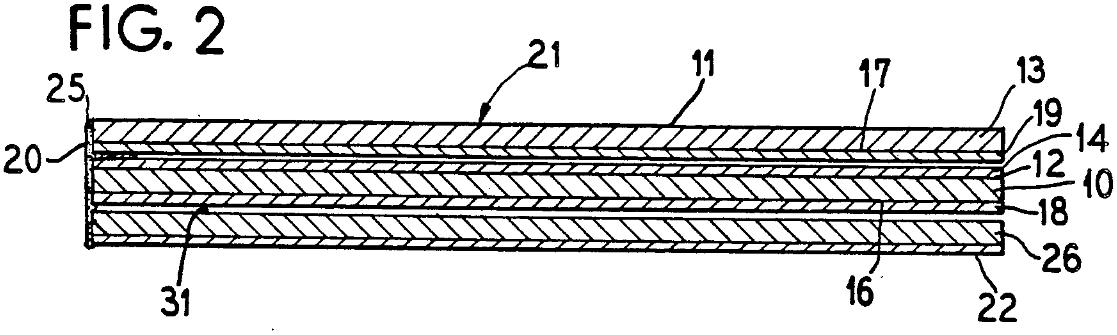
FIG. 2 illustrates a cross-sectional view of the sheets of FIG. 1 taken along lines II—II.

Referring now to FIG. 2, the unit 21 includes two sheets of paper 10 and 13. As illustrated, a sheet 10 is coated on a first side 12 with a front coating (CF) 14 and side 16 with a pad coat 18 of the present invention. Sheet 13 is coated on a back surface 17 with a back coating (CB) 19 wherein the CB 19 and CF 14 cooperate to duplicate on surface 12 what is written or typed on surface 11.

As previously stated, sheet 10 includes pad coat 18. The pad coat 18 prevents the fan-out padding adhesive 20 that is applied to an edge 25 of the sheets of paper 10, 13, and 26 from wetting the side 16 of the paper. This prevents the bottom surface 16 from being secured to a third sheet 26. This allows the two sheets of paper 10 and 13 to be easily separated from the sheet 26.

Although in the embodiment illustrated in FIGS. 1 and 2, the pad coat is coated on the back surface 16 of the sheet 10, the pad coat can also be coated on a front surface of a sheet. For example, if desired, the pad coat could be coated on the front surface 31 of the sheet 26.

By way of example, and not imitation, an example of the present invention will now be set forth:

In a high shear mixer, 63 gallons of water were placed. To the water, 9¼ lbs. of Colloids 230 (0.9 gallons) were added. 1,000 lbs. of Hydral 710-B were then added to the water and Colloids 230. The composition was then mixed for 40 minutes.

In a starch cooker, 500 gallons of water were placed. 1,100 lbs. of Penford Gum 260 were then added to the water. The mixture was cooked and held for one hour, and then diluted with water to 15% solids.

In a blend tank, the mixture from the high shear mixer container was placed, and the mixture from the starch cooker was then added to the blend tank. To the blend tank 26 gallons of FC-808 were further added. After the addition of the FC-808, 20½ lbs. of CMC7-L were added to the blend tank using an eductor. Two gallons of ammonium hydroxide were added to the mixture. The solids were then diluted to 21% of the total solution.

The resultant pad coat had the approximate following composition;

79% by weight water; and
21% by weight solids.

The solids had the following composition:

Penford Gum: 48.1%
Hydral: 710B 48.6%
FC-808: 2.1%
CMC7-L: 1.0%
Colloids: 230 0.2%

30,000 pounds of paper were manufactured and coated using the above formula. The paper was coated using a Billblade coater.

Tested properties of the sheets of paper so coated were satisfactory. Padability testing revealed that the sheets of paper coated with the pad coat had good fanapart characteristics. Further, the pad coating had good printability characteristics. Print tests run on various types of commercial printing units showed improved ink receptivity versus other pad coats.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. An improved pad coating formulation for carbonless paper comprising a mixture of:
approximately 40% to about 95% by weight water; and
approximately 5% to about 60% by weight solids, said solids comprising:
20% to about 80% by weight of a binder, selected from the group consisting of starch, protein, and polyvinyl alcohol;
20% to about 80% by weight of a pigment, selected from the group consisting of alumina trihydrate, calcium carbonate, clay calcined clay, and silicates; and
approximately 0.5% to about 10% by weight of a fluorinated compound that is capable of substantially preventing a fan-out padding adhesive from penetrating and wetting a surface of the carbonless paper, and wherein the fluorinated compound comprises at least one fluorinated saturated, monovalent, non-aromatic aliphatic radical of at least three carbon atoms in length,
whereby an improved pad coating having good padability on carbonless paper is provided.

2. The improved pad coating formulation of claim 1, wherein the binder is a hydroxyethylated corn starch.

3. The improved pad coating formulation of claim 1, wherein said solids further include a thickener comprising approximately 0.2% to about 3% by weight of said solids selected from the group consisting of carboxymethylcellulose, hydroxyethylcellulose, and alginate.

4. The improved pad coating formulation of claim 1, wherein said mixture further includes a pH adjuster.

5. The improved pad coating formulation of claim 1, wherein said solids further include a dispersing agent comprising slightly greater than 0% to about 1% by weight of said solids.

6. An improved carbonless paper for office use comprising:
a paper base; and
a back coating that is coated over at least a portion of the back of the paper base,
said back coating comprising:
20% to about 80% by weight of a binder selected from the group consisting of starch, protein, and polyvinyl alcohol;
20% to about 80% by weight of a pigment selected from the group consisting of alumina trihydrate, calcium carbonate, clay, calcined clay, and silicates; and
approximately 0.5% to about 10% by weight of a fluorinated compound that is capable of substantially preventing a fan-out padding adhesive from penetrating and wetting a surface of the carbonless paper, and wherein the fluorinated compound comprises at least one fluorinated saturated aliphatic radical monovalent, non-aromatic, of at least three carbon atoms in length
whereby a carbonless paper having good padability on documents is provided.

* * * * *